Aug. 27, 1957  H. DANNER  2,804,141
BAND CUTTER
Filed May 19, 1955  2 Sheets-Sheet 1

INVENTOR:
Hermann Danner
BY:
Michael S. Striker
agt.

Aug. 27, 1957    H. DANNER    2,804,141
BAND CUTTER

Filed May 19, 1955    2 Sheets-Sheet 2

INVENTOR:
Hermann Danner
BY:
Michael S. Striker
agt.

United States Patent Office 2,804,141
Patented Aug. 27, 1957

2,804,141

BAND CUTTER

Hermann Danner, Stuttgart-Bad Cannstatt, Germany, assignor to Fortuna-Werke Spezialmaschinenfabrik A. G., Stuttgart-Bad Cannstatt, Germany Application May 19, 1955, Serial No. 509,637
In Germany October 1, 1948

Public Law 619, August 23, 1954
Patent expires October 1, 1968

7 Claims. (Cl. 164—35)

The present invention relates to a cutting machine used for cutting material such as leather, rubber, felt, and the like.

With machines of this type special problems arise since it is necessary to guide a band cutter of the machine accurately at least at the part thereof which cuts the material at any given instant, and since it is necessary to provide a layer of a liquid such as water on the cutting edge of such a band cutter.

One of the objects of the present invention is to provide a carrier capable of accurately guiding that part of a band cutter which actually cuts the work material at any given instant.

Another object of the present invention is to provide a means for adjustably supporting a carrier of this type on the frame of the machine as well as to render this carrier easily removable from the machine so that parts thereof may be quickly and easily cleaned.

A further object of the present invention is to provide an adjusting means for adjusting the band cutter with respect to the carrier.

An additional object of the present invention is to provide an exceedingly simple structure for directing a liquid such as water or the like to the cutting edge of the band cutter.

Also it is an object of the present invention to include in a carrier of the above type a means for applying a lubricant to the face of the band cutter.

With the above objects in view, the present invention mainly consists of a band cutter carrier which is shiftably carried by a machine frame for movement onto and off from the latter as well as for adjustable movement thereon. This carrier is formed at an edge with an elongated slot in which the band cutter moves, and a roller means is mounted on the carrier and engages the rear edge of the band cutter to guide the same, an adjusting means being operatively connected to the roller means for adjusting the same with respect to the carrier. This carrier is formed with cutouts having outlet ends adjacent the carrier slot for guiding a liquid such as water to the cutting edge of the band cutter, and these cutouts are covered with a cover plate along which the work material moves. Also, the carrier includes in its interior portion at least one recess in which an oil-soaked member may be located in engagement with a face of the band cutter for lubricating the latter.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings, in which:

Figure 1:
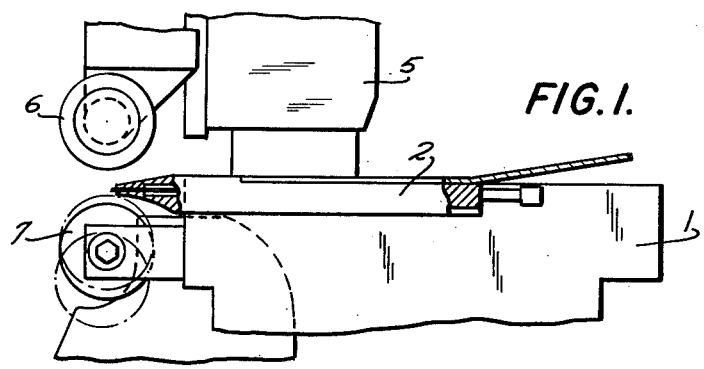
Fig. 1 is a fragmentary, schematic, partly sectional, side elevational view of a machine including features of the present invention.
Figure 2:
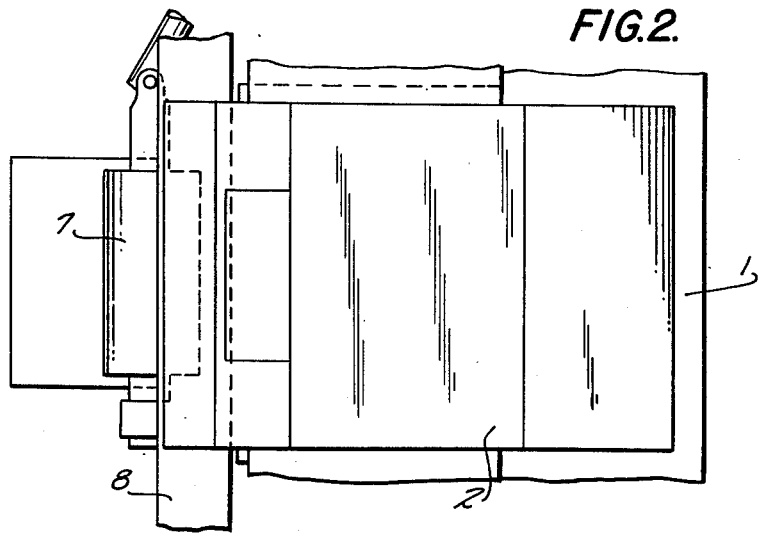
Fig. 2 is a fragmentary plan view taken just above the band cutter carrier of the invention.
Figure 3:
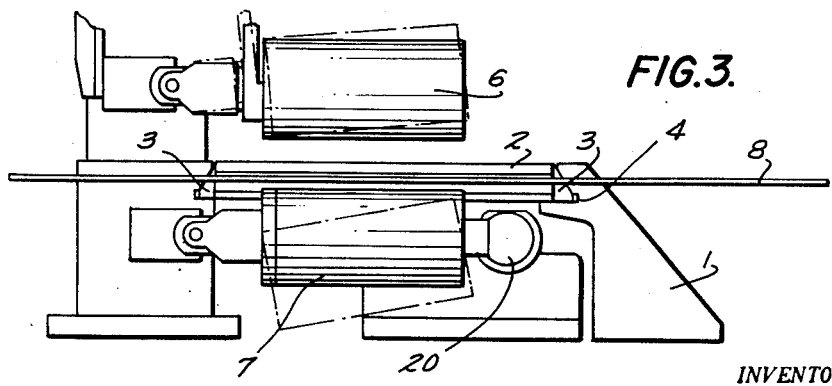
Fig. 3 is a schematic front view of the machine of the invention.

The machine of the invention includes a supporting frame 1 having a pair of side walls formed with parallel grooves 4, respectively, which are directed toward each other and which may, for example, have a dovetail cross-section. A band cutter carrier 2 is provided in accordance with the present invention with side edge portions 3 of a cross-section mating with that of the grooves 4, the carrier 2 having its side edge portions 3 located slidably within the grooves 4, as shown most clearly in Fig. 3, so that this carrier is shiftable along the frame 1 and may also be easily removed from and mounted on the frame 1. The frame 1 includes a stand 5 which adjustably carries, in a known way, a top feed roller 6 for adjustable movement up and down toward the carrier 2, the feed roller 6 being of any known form and being adjustable in a known way to any given angle to the horizontal plane, as indicated in dot-dash lines in Fig. 3. The frame 1 carries a lower feed roller 7 which, as indicated in dot-dash lines in Figs. 1 and 3, may also set at any desired angle to a horizontal plane and which may be urged by a spring to incline itself automatically to the angle of the lower face of the work material, a ball and socket joint 20 being diagrammatically indicated in Fig. 3 to support the bottom feed roller 7 for such tiltable movement. The feed rollers 6 and 7 are driven in any known way by elements such as shafts interconnected by universal joints.

The band cutter carrier 2 is formed across its entire front edge with an elongated slot in which the band cutter 8 is guided, this band cutter 8 being located completely within the carrier 2 except for the small cutting edge of the band cutter 8, which is the only part thereof that extends beyond the carrier 2 to engage the work material.

The carrier 2 includes a base plate 9 and a cover sheet 10 of metal or the like, as well as a portion for guiding the band cutter and portions for guiding a liquid such as water to the cutting edge of the band cutter and for holding a means for applying a lubricant to the band cutter.

Figure 4:
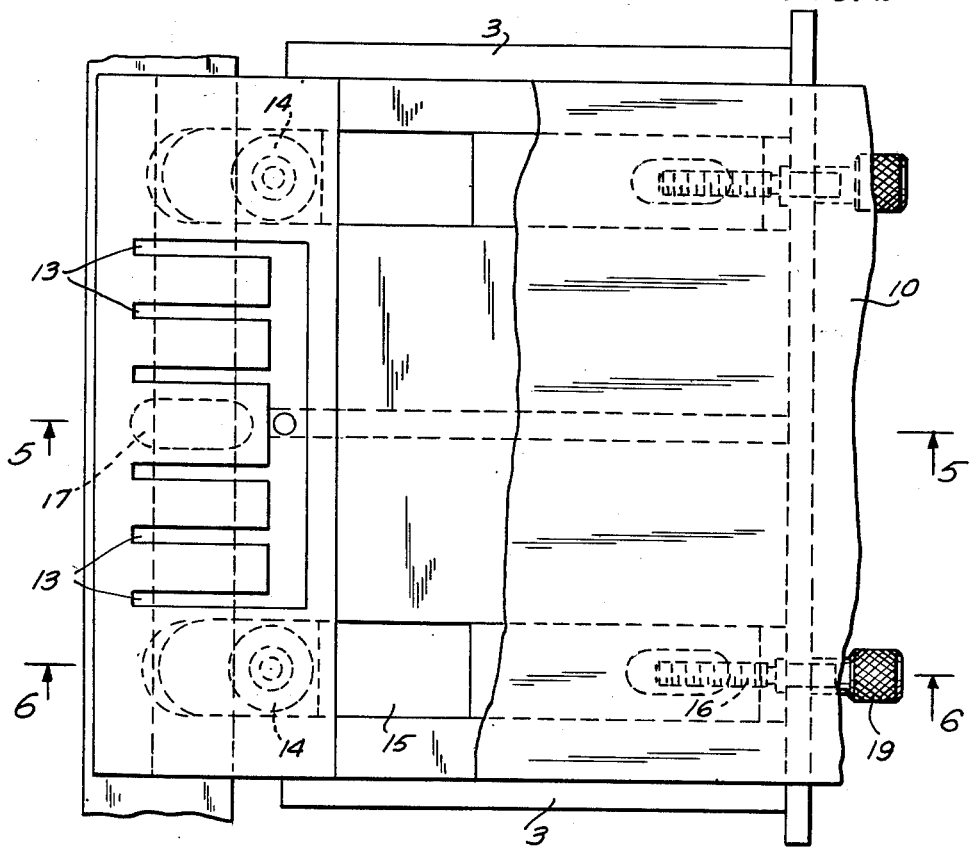
Fig. 4 is a fragmentary top plan view of the carrier of the invention with part of the cover plate thereof broken away to show the structure beneath this cover plate.
Figure 5:
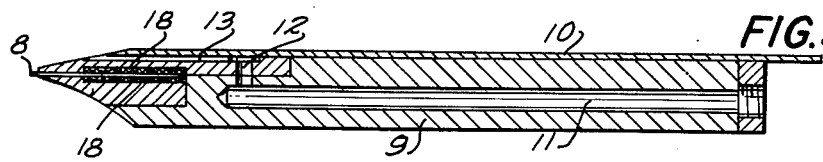
Fig. 5 is a sectional view taken along line 5—5 of Fig. 4 in the direction of the arrows.

In order to constantly provide a uniform covering of a liquid such as water along the entire length of the knife edge which extends beyond the carrier 2, the latter is formed with the elongated bore 11 in the base plate 9 which is supplied at its rear end with water or the like from any suitable source, this bore 11 communicating with an upwardly directed bore 12 which in turn communicates with cutouts in the form of channels 13 which are directed toward the knife edge and which are located beneath the cover plate 10, in the manner indicated in Figs. 4 and 5. The channels 13 have outlet ends which extend slightly beyond the left edge of cover plate 10, as viewed in Figs. 4 and 5, so that water or the like may flow from the channels 13 downwardly along the top inclined face of carrier 2 to the exposed cutting edge of the band cutter 8. It will be noted that the outlet ends of channels 13 are located closely adjacent to the edge of carrier 2 beyond which the knife edge extends.

Figure 6:
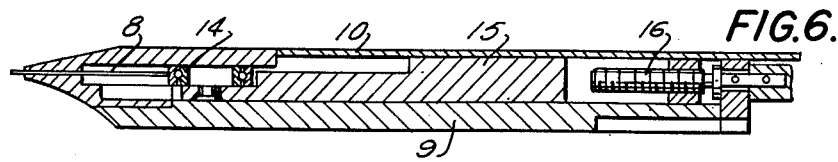
Fig. 6 is a sectional view taken along line 6—6 of Fig. 4 in the direction of the arrows.

A pair of rollers 14 are turnably mounted on support members 15, respectively, which are slidable in elongated grooves of the carrier 2, and these rollers 14 engage the rear edge of the band cutter 8 to guide the latter. A pair of screw members 16 threadedly engage the roller support members 15 at their rear ends, these screw members 16 respectively extending into cutouts of the members 15 in the manner indicated in Figs. 4 and 6. As is indicated diagrammatically in Fig. 6, each screw 16 is carried by the carrier 2 for turning movement but is restrained against axial movement so that turning of screws 16, by engaging the knurled ends 19 thereof shown in Fig. 4, adjusts members 15 and rollers 14 therewith. Thus, the rollers 14 may be shifted from time to time toward the cutting edge of band 8 to shift the latter to the left, as viewed in Figs. 4–6 so as to compensate for wearing away of the band cutter and so as to accurately guide the latter.

Along the path of movement of the band cutter, the carrier 2 is formed with cutouts 17 in which oil-soaked members 18, of felt or the like, are located to engage opposite faces of the band cutter, respectively, as indicated in Fig. 5, for lubricating the band cutter which passes between the members 18 and engages the same.

The above described carrier 2 of the present invention may be very easily assembled from metallic members made of steel, for example, and connected together in any suitable way.

It will be understood that each of the elements described above, or two or more together, may also find a useful application in other types of band cutters differing from the types described above.

While the invention has been illustrated and described as embodied in adjustable band cutters, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention, and therefore, such adaptations should and are intended to be comprehended within the meaning and range of equivalence of the following claims.

What is claimed as new and desired to be secured by Letters Patent is:

1. In a cutting machine, in combination, a frame; and a carrier carried by said frame and formed at an edge with an elongated slot, in which a band cutter may be guided, and with cutouts for guiding a liquid to the cutting edge of a band cutter located in said slot.

2. In a cutting machine, in combination, a frame; a carrier carried by said frame and formed at an edge with an elongated slot, in which a band cutter may be guided, and with cutouts for guiding a liquid to the cutting edge of a band cutter located in said slot; and guide means forming part of said carrier and frame for guiding said carrier for shifting movement with respect to said frame and for movement onto and off from said frame.

3. In a cutting machine, in combination, a frame; a band cutter carrier carried by said frame and formed at an edge with an elongated slot in which a band cutter may move and with cutouts communicating with a part of said carrier adjacent said slot for guiding a liquid to the cutting edge of a band cutter in said slot; and a cover plate on said carrier covering said cutouts.

4. In a cutting machine, in combination, a supporting frame having a pair of side walls formed respectively with a pair of elongated, aligned, parallel slots directed toward each other; and a band cutter carrier having free side edge portions respectively slidable in said slots and itself formed with an elongated slot in which a band cutter may move.

5. In a cutting machine, in combination, a supporting frame having a pair of side walls formed respectively with a pair of elongated, aligned, parallel slots directed toward each other; a band cutter carrier having free side edge portions respectively slidable in said slots and itself formed with an elongated slot in which a band cutter may move; and roller means turnably mounted in said carrier in communication with said slot for engaging the rear edge of a band cutter.

6. In a cutting machine, in combination, a supporting frame having a pair of side walls formed respectively with a pair of elongated, aligned, parallel slots directed toward each other; a band cutter carrier having free side edge portions respectively slidable in said slots and itself formed with an elongated slot in which a band cutter may move; roller means turnably mounted in said carrier in communication with said slot for engaging the rear edge of a band cutter; and adjusting means operatively connected to said roller means for adjusting the position of the same in said carrier.

7. In a cutting machine, in combination, a supporting frame having a pair of side walls formed respectively with a pair of elongated, aligned, parallel slots directed toward each other; a band cutter carrier having free side edge portions respectively slidable in said slots and itself formed with an elongated slot in which a band cutter may move; roller means turnably mounted in said carrier in communication with said slot for engaging the rear edge of a band cutter; support means carrying said roller means and being movably carried by said carrier; and screw means operatively engaging said support means for shifting the same and said roller means therewith with respect to said carrier.

References Cited in the file of this patent

UNITED STATES PATENTS

| 1,382,755 | Baxter | June 28, 1921 |
| 1,832,424 | Rau | Nov. 17, 1931 |
| 1,834,762 | Bjorkland | Dec. 1, 1931 |
| 2,670,768 | Yohn | Mar. 2, 1954 |

FOREIGN PATENTS

| 802,643 | Germany | Feb. 15, 1951 |
| 273,483 | Switzerland | May 16, 1951 |